July 20, 1954
K. G. STRUNK
2,684,398
CONDUIT FERRULE
Filed April 30, 1952
4 Sheets-Sheet 4
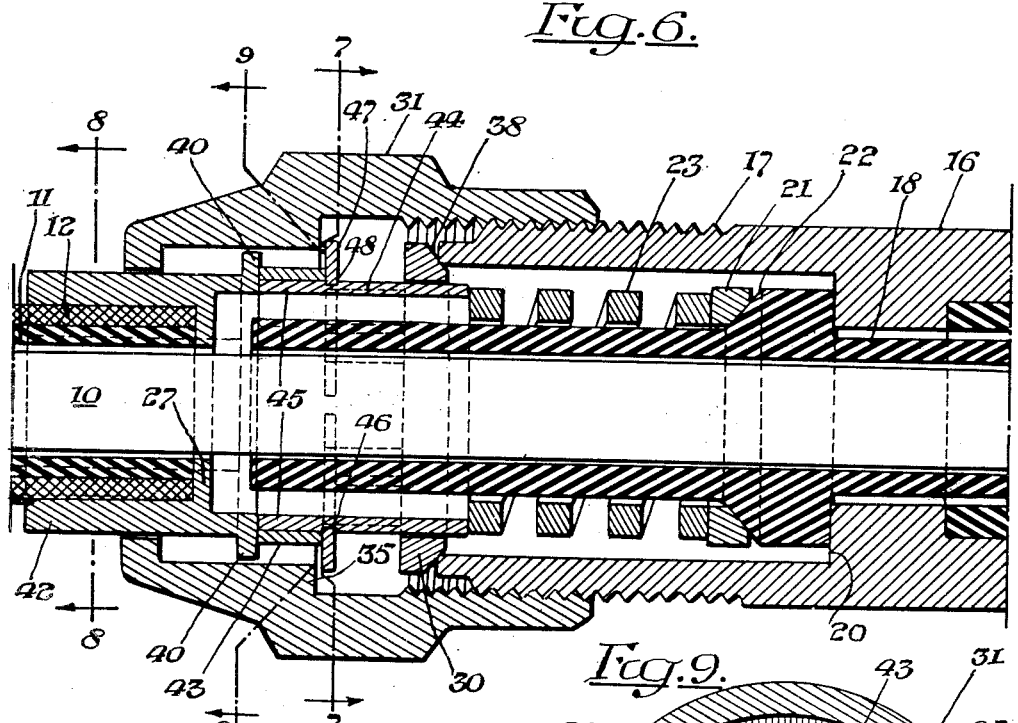
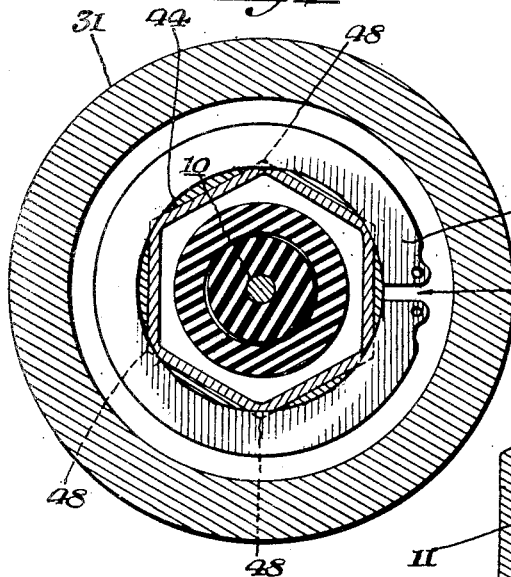
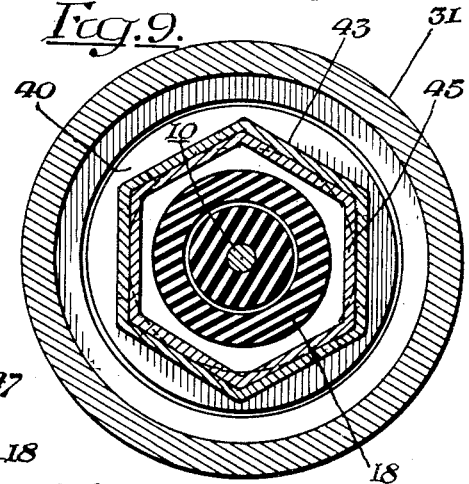
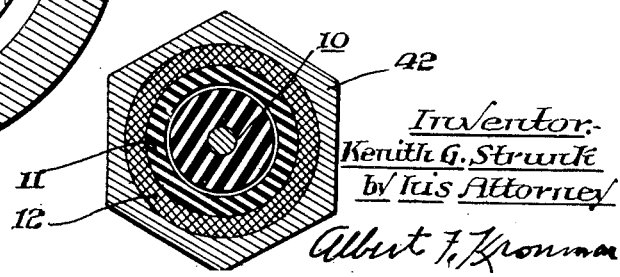
Inventor:
Kenith G. Strunk
by his Attorney
Albert F. Kronman Patented July 20, 1954

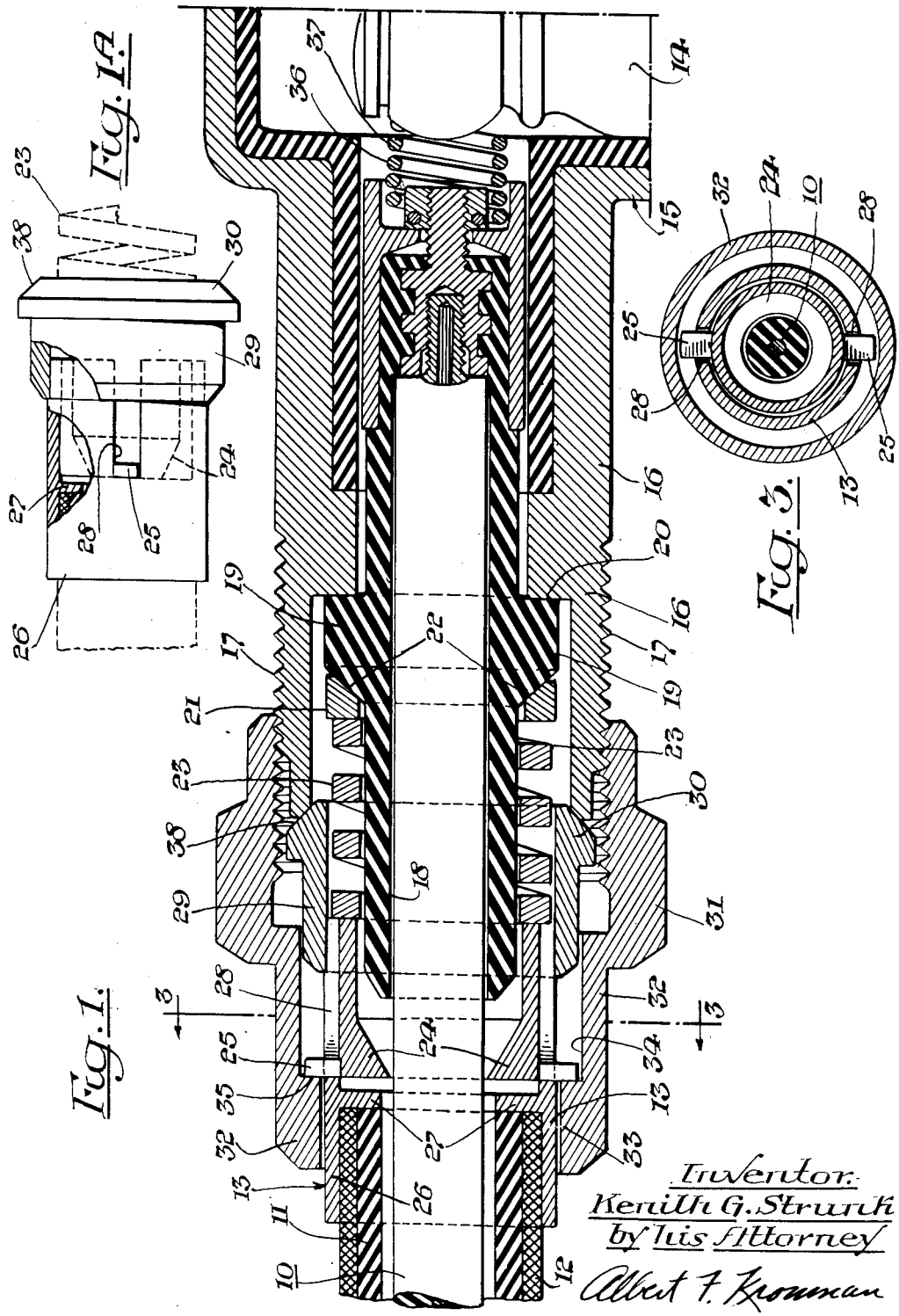

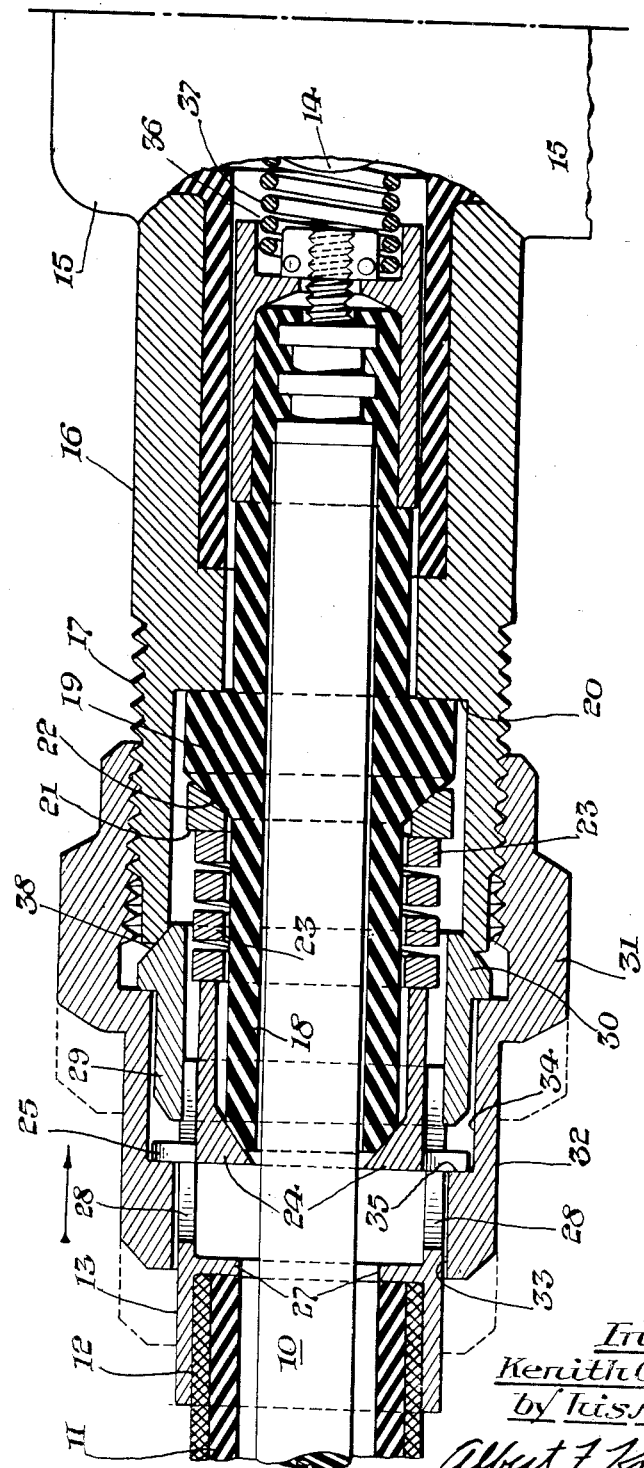

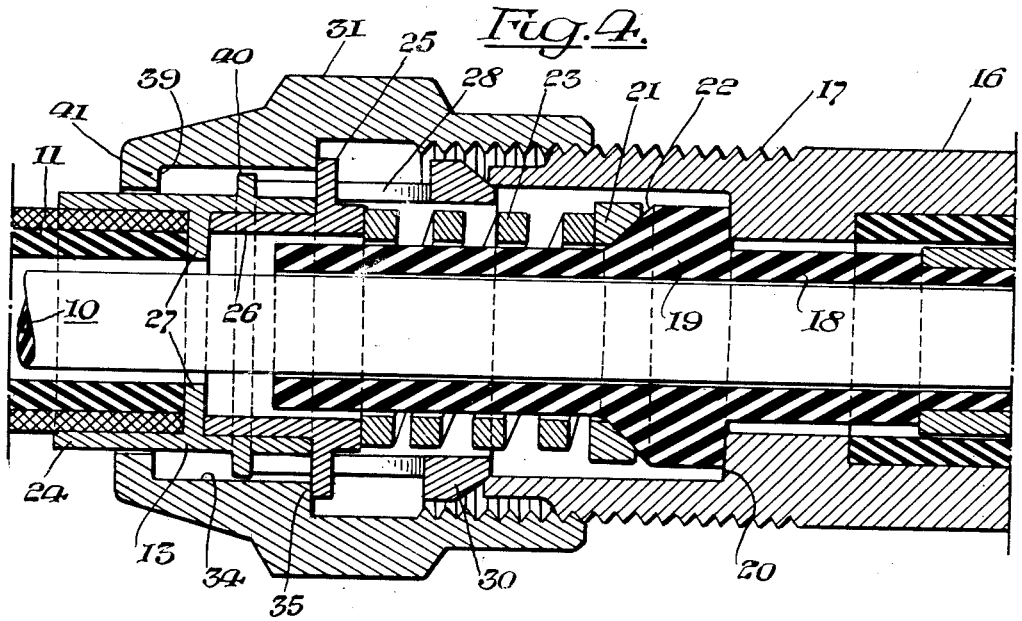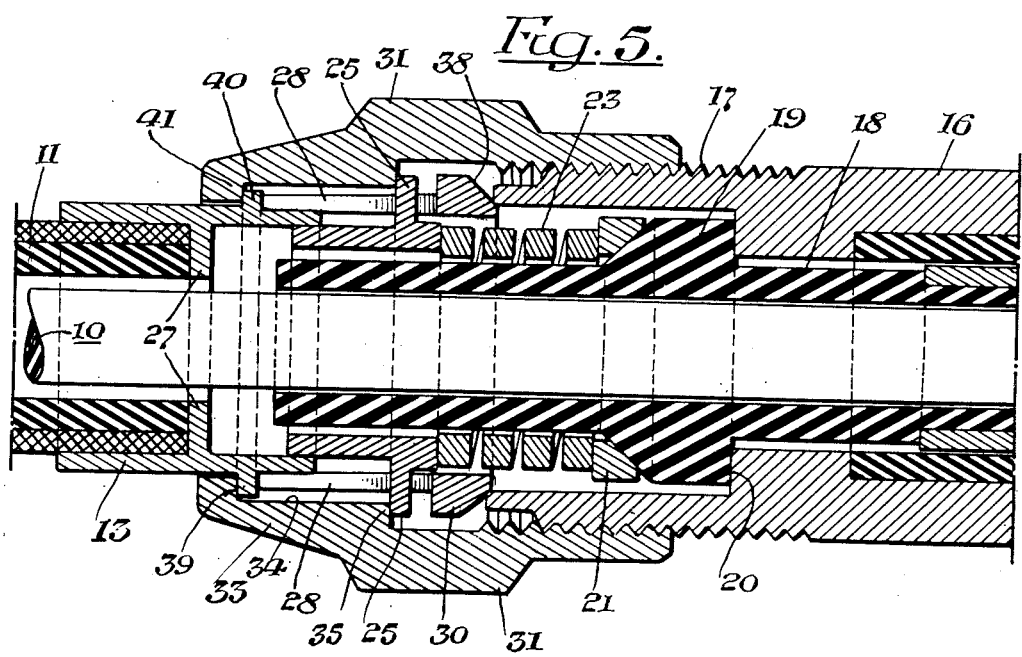

2,684,398

UNITED STATES PATENT OFFICE 2,684,398

CONDUIT FERRULE

Kenith G. Strunk, East Orange, N. J., assignor to Breeze Corporations, Inc., Newark, N. J., a corporation of New Jersey Application April 30, 1952, Serial No. 285,196

5 Claims. (Cl. 174—77)

This invention relates to conduit couplings, such as are used to connect the various elements of a radio shielded ignition system for internal combustion engines.

Where a length of conduit having terminals at each end is to be incorporated within an ignition system, it becomes necessary to provide a liquidproof seal at the coupling point. A further difficulty is encountered when the length to be spanned by the conduit is fixed and a suitable electrical contact is to be made therebetween. The conductor cable, such as a length of electrical ignition wire which extends through the conduit, must be of such length that the coupling operation neither forces it back upon itself within the conduit (which would result in kinking or injury to the assembly) nor produces an unsatisfactory electrical contact.

Accordingly, it is an object of the present invention to provide a conduit coupling which will enable the ignition wire carried therein to remain stationary during the installation thereof.

Another object of the present invention is to provide a conduit assembly which will prevent moisture from entering sections of the ignition system.

A further object of the present invention is to enable the liquid excluding gasket within the coupling to be compressed without changing the relationship of the ferrule, gasket and end of cable located at the coupling point.

A feature of the present invention is the use of a slidable collar in conjunction with a spring and ferrule for joining the elements of a coupling into watertight relationship.

Another feature of the present invention is the provision of a ferrule which will compensate for the amount of travel necessary to couple the various elements together, without disturbing the relative position of the conductor cable within the assembly.

A further feature is the provision of a slidable ferrule which will maintain the requirements of electrical shielding while performing the function of uniting the elements in electrical contact with a waterproof seal at said coupling point.

The invention consists of the construction, combination and arrangement of parts, as herein illustrated, described and claimed.

In the accompanying drawings, forming a part hereof, are illustrated three forms of embodiment of the present invention, in which drawings similar reference characters designate corresponding parts, and in which:

Figure 1 is a vertical section, somewhat enlarged, taken through a conduit coupling, made in accordance with the present invention.

Figure 1-A is a top plan view, partially cut away, of the ferrule and collar assembly shown in Figure 1.

Figure 2 is a vertical section of the conduit coupling shown in Figure 1, in the tightened or sealed position.

Figure 3 is a sectional view taken on line 3—3 of Figure 1, looking in the direction indicated by the arrows.

Figure 4 is a vertical section taken through a second embodiment of a conduit coupling, made in accordance with the present invention, showing said coupling at the beginning of the engagement between the complementary elements.

Figure 5 is a vertical section of a conduit coupling, as shown in Figure 4, illustrated in its tightened or sealed position.

Figure 6 is a vertical section, somewhat enlarged, taken through a third embodiment of a conduit coupling, in accordance with the present invention.

Figure 7 is a cross-sectional view, taken on line 7—7 of Figure 6, looking in the direction indicated by the arrows.

Figure 8 is a cross-sectional view, taken on line 8—8 of Figure 6, looking in the direction indicated by the arrows.

Figure 9 is a cross-sectional view, taken on line 9—9 of Figure 6, looking in the direction indicated by the arrows.

Referring to the drawings, and particularly Figures 1, 1-A, 2 and 3, 10 indicates a suitable length of conductor cable, such as an electrical ignition wire, carried within a piece of conduit 11, which conduit is covered by an electrically conductive radio shielding substance, such as wire braid 12.

A terminal ferrule 13 is secured to the end of the conduit, as by silver-soldering said ferrule 13, to the wire braid 12.

In the embodiment of the present invention shown in Figures 1 and 2, the coupling is used in conjunction with a shielded spark plug 14. The spark plug shield 15 is provided with an elongated outlet 16 which connects with the interior of the shield 15. The outlet 16 is preferably provided with an external thread 17 for a hereinafter described purpose. The conductor cable 10 projects beyond the terminal ferrule 13 an amount just sufficient to reach into the outlet 16 of the shield 15, so as to enable the said cable 10 to make an electrical contact with the spark plug 14. The actual contact point may consist of the assembly 36 shown in Figures 1 and 2, which assembly is well known, and forms no part of present invention.

A sealing gasket 18 is slipped upon the conductor cable 10 before the contact assembly is placed thereon. The sealing gasket 18 is substantially tubular and is formed from a suitable material such as rubber, neoprene, or the like, which material may be deformed to provide a liquid tight seol. The sealing gasket 18 is provided with an outwardly disposed flange 19 which may be integral with the said gasket 18. The flange 19 is of sufficient size to overlie the opening in the outlet 16 of the spark plug shield 15.

A shoulder 20 is formed within the outlet 16 for the purpose of providing a seat for the contact face of the flange 19. The cable side of the flange 19 is supported by a ring 21 which may be beveled, as indicated at 22, to conform to the side of the flange 19 adjacent thereto. A coil spring 23 is located between the ring 21 and the cable end of the gasket 18. The coil spring 23 is disposed about the gasket 18, and its forward end bears against the ring 21. The opposite or cable end of the coil spring 23 is in contact with the sealing face of a collar 24. The collar member shown in Figures 1, 1-A and 3 is provided with outwardly disposed lugs 25 on opposite sides of said collar 24.

The terminal ferrule 13 is preferably made in two parts. The cable side of the ferrule (best shown in Figure 1-A) consists of a hollow tube 26 having an internal boss 27 therein for the purpose of providing a shoulder against which the conduit 11 can be located. The tubular portion 26 of the ferrule 13 is provided with slots 28 at the forward end thereof, for the purpose of receiving therein the lugs 25. After the lugs 25 of the collar 24 have been located within the slots 28, the second portion of a ferrule 13, which consists of a ring shaped member 29, having an internal diameter equal to the external diameter of the tubular portion of the ferrule 26, is slipped upon the forward end of the said tubular portion and secured thereon, as by silver-soldering, welding, or the like. The disposition of the two portions of the ferrule are such as to provide an open slot therein, so that the lugs 25 of the collar member 24 may travel longitudinally of the assembly for a desired distance. The forward edge of the ring shaped member 29 of the ferrule 13 may be provided with the ball 30 of a ball and cone type of joint, as shown in Figures 1 and 1-A.

A nut 31, best shown in Figures 1 and 2, overlies the ferrule and collar assembly. The nut 31 is provided with an elongated skirt 32 upon the cable side thereof. The skirt member 32 is provided with a bore 33 of a size sufficient to accommodate the ferrule 13, and to enable the nut to be freely rotated thereupon. The internal bore 33 of the skirt member 32 is recessed as indicated at 34, for the purpose of clearing the lugs 25. A shoulder 35 is thus formed within the skirt 32, which shoulder 35 bears against the side of the lug 25 of the collar 24.

When it is desired to unite the coupling described above, the contact assembly 36 may be thrust within the complementary portion of the ignition system (as for example, the outlet of the spark plug 15), and the nut engaged with the external threads 17 of said complementary portion. As the nut is tightened, the shoulder 35 of the skirt member 32 will force the lugs 25 forward within the slots 28. The lugs 25 in turn will move the collar member 24, causing said collar member to compress the coil spring 23 in the manner shown in Figure 2.

The coil spring 23 forces the ring member 22 against the flanged portion 19 of the gasket 18, thereby compressing said gasket flange, and forming a liquid tight seal within the coupling at that point. Despite the longitudinal motion of the nut 31, the collar 24, and the compression of the spring 13 of the gasket 18, there is no corresponding motion in the conductor cable and no differential in the respective position of the ferrule and said conductor cable. The small coil spring 37 of the contact assembly is compressed and provides the requisite electrical contact, without forcing the ignition cable 10 back into the conduit 11. Accordingly, the ignition cable is not caused to kink or buckle so as to interfere with its axial position within the conduit.

As the nut 31 reaches its tightened position, the ball and cone joint 38 will be united, and the compression of the sealing portion 19 of the gasket 18 will be at the desired strength.

Referring to the second embodiment of the invention, shown in Figures 4 and 5, there is disclosed a coupling which is particularly adapted for those installations where it is desired not to have any direct opening between the inner and outer spaces, which openings are not barriered by complete circumferential electrical continuity. In this construction, the nut 31 is provided with an additional step 39, which step is adapted to clear a flange 40 provided on the ferrule 13. The flange 40 constitutes a stop for the forward travel of the nut 31, as shown in Figure 5. The flange 40 and the shoulder 41 of the step 39, also form a metal-to-metal contact when the coupling is united. The slot 28 within which the lug 25 travels is thus covered at all times by the skirt 33.

Accordingly, it will be seen that there is provided a continuous electrical shield around the coupling, despite the requirement for a slot within which the lugs 25 may travel so as not to alter the respective positions of the ignition cable 10 and the ferrule 13.

While the above described structures constitute preferred embodiments of the present invention, it is within the purview of this disclosure to compress the collar 19 of the gasket 18 without resorting to the use of the spring 23. Thus for example, the collar 24 might be extended so as to bear directly against the ring 22, or even the sealing portion 19 of the gasket 18.

It is clear that other means, whereby the nut 31 may engage the collar 24, so as to move it forward during the tightening operation, may be employed, without departing from the spirit of the present invention. Thus, it is possible, for example, to enlarge the ferrule 13 and form it so that the lugs 25 may overlie an external portion of the enlarged ferrule (said lugs extending rearwardly of the collar 24 and not radially therefrom, as shown in the drawings).

The skirt 32 of the nut 31 in its forward travel during tightening of the nut, would then pick up the lugs and propel the collar in the direction of the coupling. External longitudinal paths would have to be provided in the enlarged ferrule 13 in this construction, for the purpose of receiving the lugs 25, but the slot 28, shown in the drawings, could be dispensed with.

Referring to the third embodiment of the present invention, shown in Figures 6 through 9, 42 indicates a ferrule which may be of a round or hexagonal shape, and which is secured, as by silver-soldering or the like, to the end of the wire braid 12. The inwardly disposed shoulder 27 is provided to act as a stop for the braid 12 within the ferrule 42. The coupling end of the ferrule 42 is provided with a flange 40, similar to that previously described, and a tubular member 43, which is hexagonal in shape. The hexagonal member 43 carries the ball 30 of the ball and cone joint 38, on the end thereof. The member 43 is cut away at its crests, as indicated at 44 in Figures 6 and 7, the cut-away portion being located between the ball 30 and a suitable distance in front of the flange 40.

An inner hexagonal member 45 is telescopically fitted within the outer hexagonal member 43. The member 45 is provided with a groove 46 at the point where it underlies the cut-away portion 44 of the outer hexagonal member 43. The groove 46 is adapted to receive therein a snap ring 47. The snap ring 47 is slipped over the outer hexagonal member 43, and grasps the inner hexagonal member 45 only by the crests of said member which extend through the cutaway portion 44 of the outer hexagonal member 43, as indicated at 48 in Figures 6 and 7. The nut 31 employed in this embodiment of the present invention, is similar to that shown in connection with Figures 4 and 5, in both structure and operation. Thus, as the nut 31 is tightened upon the threads 17 of the outlet 16, its inner shoulder 35 will bear against the snap ring 47 and draw it in the direction of the coupling. The forward motion of the snap ring 47 will in turn move the inner hexagonal member 45 in the same direction, thereby compressing the spring 23 and achieving the liquid proof coupling, which is the object of the present invention.

It will be seen from an examination of the third embodiment of the present invention, that the entire ferrule structure may be made in one piece, and the snap ring engaged upon the inner hexagonal member 45 after it has been placed within the outer hexagonal member 43. Alternately, the coupling may be disassembled by removing the snap ring and sliding the inner hexagonal member 45 out of its telescopic engagement with the outer hexagonal member 43.

Having thus fully described the invention, what is claimed as new and desired to be secured by United States Letters Patent, is:

1. A cable and conduit coupling assembly comprising, a ferrule secured to the end of the conduit, a longitudinal slot in the wall of the ferrule, a collar member within the ferrule disposed about the cable and axially slidable upon the cable, an outwardly disposed lug on the collar, said lug being located within and projecting through and beyond the ferrule slot, a sealing gasket slipped upon the cable between the collar and said cable, a flanged element on the coupling end of said gasket extending in front of the collar, a nut rotatably carried upon the outside of the ferrule adapted to engage a threaded coupling point said coupling point having a flanged element receiving shoulder therein, a skirt on the conduit side of the nut, said skirt being provided with an inwardly disposed boss thereon and nut and collar linking means carried beneath the nut comprising the boss of the skirt and the collar lug whereby the uniting of the nut with the coupling point will cause the nut to urge the collar against the sealing gasket to form a liquidproof seal within the coupling.

2. A cable and conduit coupling assembly comprising, a ferrule secured to the end of the conduit, longitudinal slots in the wall of the ferrule, a collar member within the ferrule disposed about the cable and axially slidable upon the cable, outwardly disposed lugs on the collar, said lugs being located within and projecting through and beyond the ferrule slots, a sealing gasket slipped upon the cable between the collar and said cable, a flanged element on the coupling end of said gasket extending in front of the collar, a nut rotatably carried upon the outside of the ferrule adapted to engage a threaded coupling point said coupling point having a flanged element receiving shoulder therein, a skirt on the conduit side of the nut, said skirt being provided with an inwardly disposed boss thereon and nut and collar linking means carried beneath the nut comprising the boss of the skirt and the collar lugs whereby the uniting of the nut with the coupling point will cause the nut to urge the collar against the sealing gasket to form a liquidproof seal within the coupling.

3. A cable and conduit coupling assembly comprising, a ferrule secured to the end of the conduit, longitudinal slots in the wall of the ferrule, a collar member within the ferrule disposed about the cable and axially slidable upon the cable, outwardly disposed lugs on the collar, said lugs being located within and projecting through and beyond the ferrule slots, a sealing gasket slipped upon the cable between the collar and said cable, a flanged element on the coupling end of said gasket extending in front of the collar, a coil spring around the cable between the collar member and the gasket flange, a nut rotatably carried upon the outside of the ferrule adapted to engage a threaded coupling point said coupling point having a flanged element receiving shoulder therein, a skirt on the conduit side of the nut, said skirt being provided with an inwardly disposed boss thereon, and nut and collar linking means carried beneath the nut comprising the boss of the skirt and the collar lugs whereby the uniting of the nut with the coupling point will cause the nut to urge the collar against the coil spring and compress the flange of the sealing gasket to form a liquidproof seal within the coupling.

4. A cable and conduit coupling assembly comprising, a ferrule secured to the end of the conduit, longitudinal slots in the wall of the ferrule, a collar member within the ferrule disposed about the cable and axially slidable upon the cable, outwardly disposed lungs on the collar, said lugs being located within and projecting through and beyond the ferrule slots, a sealing gasket slipped upon the cable between the collar and said cable, a flanged element on the coupling end of said gasket extending in front of the collar, a coil spring around the cable between the collar member and the gasket flange, a ring carried upon the gasket and bearing against the conduit side of the gasket flange, a nut rotatably carried upon the outside of the ferrule adapted to engage a threaded coupling point said coupling point having a flanged element receiving shoulder therein, a skirt on the conduit side of the nut, said skirt being provided with an inwardly disposed boss thereon, and nut and collar linking means carried beneath the nut comprising the boss of the skirt and the collar lugs whereby the uniting of the nut with the coupling point will cause the nut to urge the collar against the coil spring and ring so as to compress the flange of the sealing gasket to form a liquidproof seal within the coupling.

5. A cable and conduit coupling assembly comprising, a ferrule secured to the end of the conduit, a longitudinal slot in the wall of the ferrule, a collar member within the ferrule disposed about the cable and axially slidable upon the cable, an outwardly disposed lug on the collar, said lug being located within and projecting through and beyond the ferrule slot, a sealing gasket slipped upon the cable between the collar and said cable, a flanged element on the coupling end of said gasket extending in front of the collar, a nut rotatably carried upon the outside of the ferrule adapted to engage a threaded coupling point said coupling point having a flanged element receiving shoulder therein, a skirt on the conduit side of the nut, said skirt being provided with an internal step forming shoulder and nut and collar linking means comprising the step shoulder of the nut and the collar lug carried beneath the nut whereby the uniting of the nut with the coupling point will cause the nut to urge the collar against the sealing gasket to form a liquidproof seal within the coupling.

References Cited in the file of this patent

UNITED STATES PATENTS

| Number | Name | Date |
|---|---|---|
| 2,583,067 | Strunk | Jan. 22, 1952 |
| 2,606,951 | Bychinsky | Aug. 12, 1952 |